O. DREHER.
APPARATUS FOR STORING EGGS.
APPLICATION FILED JAN. 21, 1913.
1,091,307.
Patented Mar. 24, 1914.
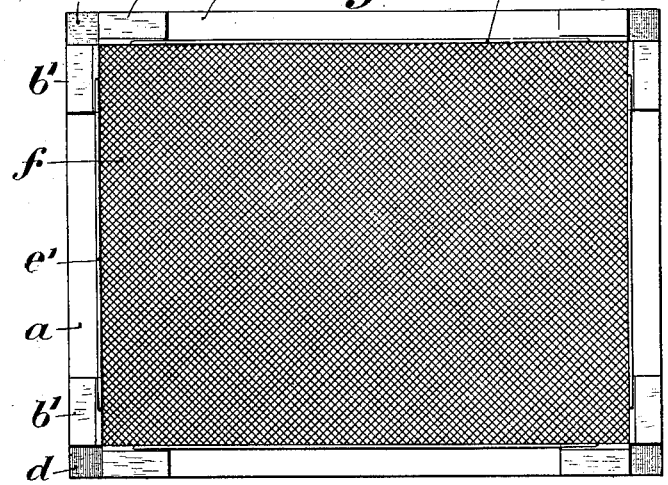
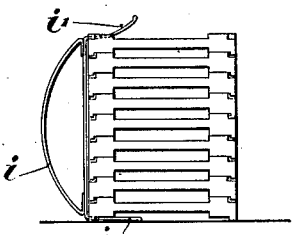
Witnesses:
M. E. McDade
Inventor
Oswald Dreher
by James L. Norris,
Attorney.

UNITED STATES PATENT OFFICE.

OSWALD DREHER, OF TAMBACH, GERMANY.

APPARATUS FOR STORING EGGS.

1,091,307. Specification of Letters Patent. Patented Mar. 24, 1914.

Application filed January 21, 1913. Serial No. 743,371.

*To all whom it may concern:*

Be it known that I, OSWALD DREHER, a subject of the German Emperor, residing at Tambach, Duchy of Saxe-Coburg-Gotha, Germany, have invented certain new and useful Improvements in or Relating to Apparatus for Storing Eggs, of which the following is a specification.

In storing eggs, it is necessary to see that the eggs are properly ventilated in order to avoid spoiling them. It is further of importance for the preservation of the eggs that they should be kept flat. For brooding eggs this is an absolutely essential condition, for the reason that if the eggs in question are stored in a vertical position, the treadle, also called the chalaza, connecting together the yolk and white, would be destroyed, which would render the eggs unsuitable for brooding purposes. Moreover, eggs that have to be stored for a long time, must be turned from time to time, in order to preserve to the egg its uniform quality.

The device forming the subject of this invention fulfils these conditions in a perfect manner, as it affords access of air to the eggs placed flat, from all sides. The turning of the eggs stored in the new device, is greatly simplified by the fact that it is not necessary to turn each egg separately, but a layer containing a large number of eggs, can be turned at once, or a whole stack containing any desired number of layers of eggs, can be brought by tipping into a position corresponding to the turning of eggs to 180°.

The new device which offers these advantages, consists of superposed trays made of wooden frames provided with perforated bottoms held in superposed position by means of ledges secured to their corners, at a distance corresponding to the thickness of the eggs, the shifting of the single trays relatively to each other being at the same time prevented by the projections and recesses provided at the corners. The inner space of these trays, which latter are secured together by suitable means such as hooks, clamps or the like, is laterally limited by elastic wires which, during the turning of the filled trays, afford to the eggs an elastic support and prevent in a reliable manner the eggs from being broken or cracked even when manipulating only partially filled trays, or when turning the same, even in case of careless manipulation.

Two constructions according to this invention are illustrated by way of example in the accompanying drawing.

Figure 1 shows in plan a tray, Fig. 2 is a side elevation, partly in section, showing two superposed trays of one construction, Fig. 3 is a view corresponding to Fig. 2, of a slightly modified construction of the tray, and Fig. 4 is a front elevation of a stack of trays.

The trays used for receiving the eggs, consist of a wooden frame $a$ which, in the construction shown in Fig. 2, is provided with a single perforated bottom $f$. To the corners of the frame $a$ are secured, above and below the frame, short ledges $b\ b'$ which hold the superposed frames at a proper distance apart. Moreover, on the underface of each frame, at the corners, are secured depending blocks or other suitable projections $c$ for reception in recesses $d$ formed in the upper face of the next lower frame, at its corners, so that the frames of the same shape, after having been superposed, are prevented from shifting relatively to each other. To the ledges $b\ b'$ are secured elastic wires $e\ e'$ limiting the inner space of the trays. These wires form a lateral elastic support for the eggs during the turning of the filled trays.

In the construction shown in Fig. 2, in which the frames $a$ are provided with only one perforated bottom, the latter is arranged outside the center of the height of the tray determined by the thickness of the ledges $b\ b'$ and of the frame $a$, in such manner that the depth of the frame $h$ situated above the perforated bottom $f$ corresponds approximately to half the thickness of an egg, while the height $g$ measured from the perforated bottom $f$ to the bottom edge of the corner ledge $b$, is somewhat larger, so that in the case of superposed trays, the eggs arranged between the perforated bottoms $f$ do not touch the upper perforated bottom; that is to say, the sagging of the perforated bottom, produced by the weight of the eggs, does not exercise any influence on the eggs below. These trays can be made up into a stack of any desired height. If the eggs are to be turned, this is preferably done in layers, the uppermost tray of the stack being turned and placed on the one below, so that in that case the distance of the perforated bottoms $f$ from each other, corresponds to the thickness of the eggs.

The two upper trays are then seized and turned to 180°, so that in that way the uppermost tray lies at the bottom. It then forms the lowest tray for the turned over stack, while the original second tray is used, as before, for turning the next layer of eggs, and then forms a second tray of the new stack. These trays with only one perforated bottom can be used more particularly where not too great a quantity of eggs have to be stored, that is to say in ordinary households or small poultry breeding establishments.

In the construction shown in Fig. 3, the trays are provided with two perforated bottoms $f$ $f'$, the upper bottoms $f$ being at the same point as the perforated bottoms $f$ of the trays shown in Fig. 2. The lower perforated bottoms $f'$ in this case are at the same distance from the bottom edges of the ledges $b$, as the upper perforated bottoms $f$ from the upper edges of the ledges $b'$. The distance of the perforated bottom $f$ of the lower of two superposed trays, from the perforated bottom $f'$ of the tray above it, corresponds in that way approximately to the thickness of an egg, so that the eggs stored in a tray, have no play in the direction of height. If a number of these trays are formed into a stack, and the trays connected together by suitable means, the whole stack with its contents can be brought directly into an inverted position corresponding to the turning of the eggs contained in the stack, to the extent of 180°. In this case also, air is admitted to the eggs from all sides, and the elastic wires $e$ $e'$ form also in this case a lateral elastic support for the layer of eggs in question, during the turning of the stack. This construction of the frames or trays is more particularly suitable for large poultry breeding establishments or for keeping eggs in cold storage, that is to say where it is desired to store large quantities of eggs for a long time.

In order to facilitate the tipping or turning of such a stack, each of the said stacks can be provided if desired with detachable lateral brackets $i$ (Fig. 4) which, during the turning of the whole stack, form the rolling surface. Moreover, at the ends of the said brackets $i$ spring blades $i'$ or the like may be provided to facilitate the turning of a stack to be reversed, and to reduce the shock during the setting of the stack on the frame surface which was originally at the top, if the turning is done carelessly.

It must be pointed out that the new storing device further has the advantage in poultry breeding establishments that brooding eggs coming from various kinds of hens can be kept separate from each other, so that any confusion is avoided in a reliable manner. Moreover, the new device makes it also possible to control in a convenient manner each layer of eggs, as it is merely necessary for the purpose to remove the trays above the layer in question or in some cases simply to tip it to the side, whereupon access will be obtained to the layer of eggs in question.

The new device is also eminently adapted for storing fruits, of various kinds, and the like, which also must be stored properly aerated and frequently inspected, in order to remove any fruit beginning to rot. This necessary supervision is greatly facilitated by the possibility of turning the fruit in layers.

What I claim is:

1. Apparatus for storing eggs comprising a plurality of superposed trays, each consisting of a skeleton frame having a perforated supporting bottom and provided upon its opposite faces, adjacent the corners, with ledges, the ledges on the under face of each frame resting directly upon those on the upper face of the next lower frame to space the trays apart, one face of each frame being provided at its corners with vertical projections and the other face with recesses for coöperation, respectively, with the recesses and projections of the adjacent faces of the frames next above and below to prevent relative lateral movement of the trays.

2. Apparatus for storing eggs comprising a plurality of superposed, reversible trays, each consisting of a skeleton frame having a perforated supporting bottom and provided upon its opposite faces, adjacent the corners, with ledges, the ledges on the under face of each frame resting directly upon those on the upper face of the next lower frame to space the trays apart, one face of each frame being provided at its corners with vertical projections and the other face with recesses for coöperation, respectively, with the recesses and projections of the adjacent faces of the frames next above and below to prevent relative lateral movement of the trays, and wires connecting the ledges of each tray to form a yielding lateral support for the stored articles during reversal of the trays.

In testimony whereof I have hereunto set my hand in presence of two subscribing witnesses.

OSWALD DREHER.

Witnesses:
 ERNST EBERHARDT,
 ALFRED HOFFMANN.